Figure 3:
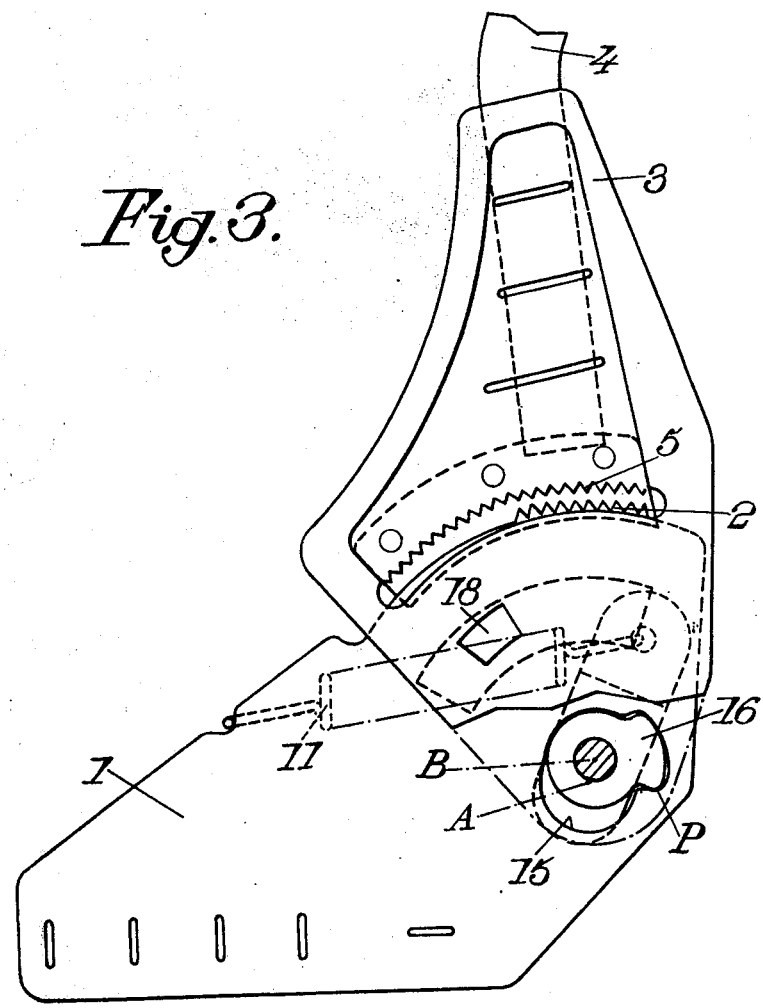

United States Patent [19]

Letournoux et al.

[11] 4,175,301

[45] Nov. 27, 1979

[54] SEATHINGE

[75] Inventors: Alain Letournoux, Orleans; Charles Canals, Mennecy, both of France

[73] Assignee: Societe Industrielle Bertrand Faure, Etampes, France

[21] Appl. No.: 867,492

[22] Filed: Jan. 6, 1978

[30] Foreign Application Priority Data

Jan. 13, 1977 [FR] France ............................... 77 00876

[51] Int. Cl.$^2$ ............................................. E05D 11/10
[52] U.S. Cl. ...................................... 16/146; 297/370; 297/373
[58] Field of Search ................. 16/139, 129, 140, 142, 16/143, 144, 145, 146, 179; 297/366, 354, 355, 356, 357, 358, 359, 360, 361, 362, 373, 374, 376, 378, 379, 370; 74/531, 437, 804, 805

[56] References Cited

U.S. PATENT DOCUMENTS

| | | | |
|---|---|---|---|
| 3,479,088 | 11/1969 | Bonnaud | 297/362 X |
| 3,562,851 | 2/1971 | Köller | 16/140 |
| 3,608,128 | 9/1971 | Faust | 297/374 X |
| 3,788,698 | 1/1974 | Perkins | 16/139 X |
| 4,035,866 | 7/1977 | Pickles | 16/146 |
| 4,082,352 | 4/1978 | Bales et al. | 16/144 X |

FOREIGN PATENT DOCUMENTS

| | | | |
|---|---|---|---|
| 1027913 | 4/1966 | United Kingdom | 297/355 |
| 1330533 | 9/1973 | United Kingdom | 297/357 |

Primary Examiner—Werner H. Schroeder
Assistant Examiner—Moshe I. Cohen
Attorney, Agent, or Firm—Larson, Taylor and Hinds

[57] ABSTRACT

A seat hinge comprising a first flange 1, integral with the sitting portion, carrying a toothed sector 2, and a second flange 3, integral with the seat-back, carrying a toothed sector 5 able to vertically engage in the sector 2, further comprises a cam 16 rotatively mounted on flange 3 and coacting with the edges of an aperture 15 formed in flange 1 so as to successively obtain rocking movements of said cam around a point of said edge and jamming effects between spiral sections of said cam and said edge.

4 Claims, 3 Drawing Figures

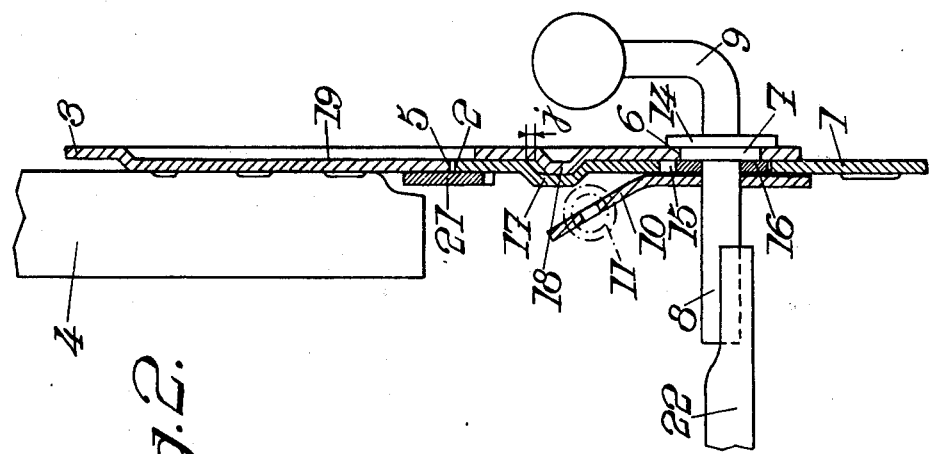
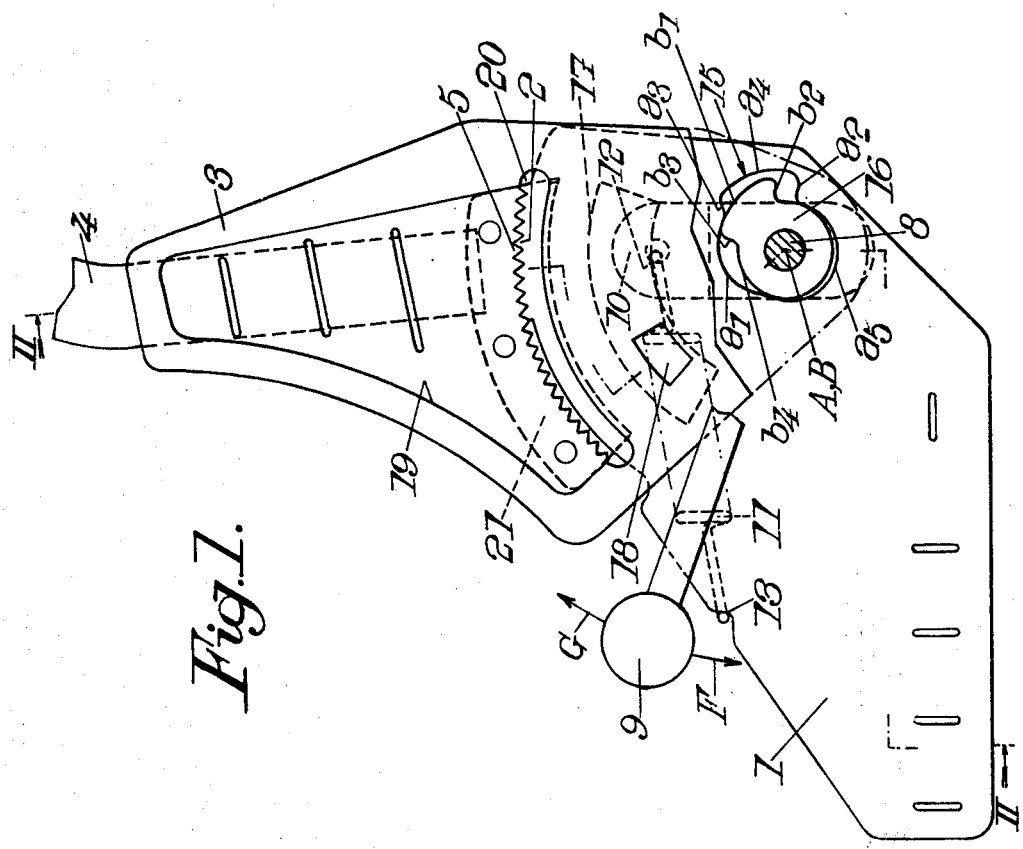

SEATHINGE

The invention relates to seat hinges, i.e. devices connecting the back to the sitting portion of a seat for angular adjustment of the back about a lower transverse horizontal axis and for maintaining this back in the chosen angular position.

It is directed more particularly, among these hinges, to those comprising: a first flange integral with the sitting portion, carrying a first toothed sector centred on a transverse horizontal axis A; a second flange integral with the seat-back, carrying a second toothed sector centred on an axis B linked to the seat back and parallel to axis A, this second sector being adapted to engage in the first sector by simply letting the two axes A and B coincide in a direction C generally vertical or slightly inclined from the vertical, said second flange being provided with a circular opening centred on axis B; a hub cylindrical in revolution jointingly housed in this circular opening and integral with a rotary cam; a control handle accessible to the person sitting in the seat and connected to the cam so that the operation of this handle causes the cam to rotate about axis B; a projection provided on the first flange for coacting with the active area of the rotary cam; and a spring angularly urging the cam and the handle in the direction which corresponds to the mutual engagement of the two toothed sectors.

The invention is directed even more particularly, because it is in this case that its application seems to offer the most interest, but not exclusively, among the hinges of the kind mentioned, to those fitted to vehicle seats, particularly those of these seats mounted in the front positions of motor vehicles.

In known embodiments of such hinges, it is difficult to completely avoid unintentional unlocking and especially to eliminate the play due to assembly tolerances or to the progressive wear of the teeth, which leads to inaccuracies in adjustment, unpleasant noises and a rapid deterioration of the mechanisms.

The aim of the invention is, especially, to remedy these disadvantages.

In seat hinges of the kind in question conforming to the invention:

the active area of the rotary cam is formed by a smooth and cylindrical portion of the edge of this cam and has a first section in the form of an arc of a spiral in relation to axis B comprising, for the locked position of the hinge, one end slightly inclined from the horizontal, a second section in the form of a radial rectilinear segment with respect to axis B extending, for the unlocked position of the hinge, in a substantially horizontal direction and a third section forming a setoff towards axis B from the end of the first section having the minimum radius, and the portion of the first flange intended to coact with the active area of the cam is formed by the smooth and cylindrical edge of an aperture formed in this first flange and has a substantially horizontal first section in the form of an arc of a spiral with respect to axis A, arranged so that the first section of the cam slides thereagainst while creating a jamming effect at the end of its angular travel corresponding to the locking of the hinge, a second substantially horizontal section in the form of a radial rectilinear segment with respect to axis A adapted to coact practically without sliding with the second section of the cam by the abutment of this latter thereagainst during unlocking operations, and a third section forming a setoff outwardly from the end of the second section having the maximum radius, this third section being located so as to be radially facing the third section of the cam when the second sections of the cam and of the edge of the aperture abut angularly one against the other, which allows relative transverse movements of the cam in relation to the aperture in direction C, these movements ensuring the unlocking of the hinge.

By the expression "substantially horizontal" used hereabove and in the description which follows is understood a direction whose greatest component is horizontal or more generally perpendicular to direction C of separation of the sets of teeth.

In preferred embodiments recourse is had furthermore to one and/or the other of the following arrangements:

the first section of the cam extends along an arc between 45° and 90°, preferably of the order of 60°, the first section of the cam is extended at both its ends by respectively the first section and the third section of this cam, defining with these latter a tooth projecting from a generally circular shaped plate, the second and the third sections of the edge of the aperture are connected to one another by a fourth concave section having a profile in the form of an arc of a spiral adapted to cover substantially jointingly the first section of the cam for the maximum unlocking position of the hinge, the profiles of the cam and of the aperture are provided so that, in the locking position, a slight radial play exists in direction C between the area of the cam opposite its first section and the portion facing the edge of the aperture but no play exists between the cam and the aperture in the horizontal direction prependicular both to axis A and to direction C.

The invention comprises, apart from these principal arrangements, certain other arrangements which are used preferably at the same time and which will be more explicitly discussed hereafter.

In what follows, there will be described a preferred embodiment of the invention with reference to the accompanying drawings in a way which is of course in no way limiting.

FIGS. 1 and 2 of these drawings show respectively, in a side view, with parts cut away and in a front view, with parts in section along II—II of FIG. 1, a seat hinge constructed in accordance with the invention, in its locked position.

FIG. 3 shows the same hinge similar to FIG. 1, but in its unlocked position.

The hinge considered comprises, on each side of the seat, a first vertical flange 1 integral with the sitting portion frame of the seat and whose upper edge has an outwardly toothed circular sector 2 centred on a transverse horizontal axis A linked to flange 1, a second vertical flange 3 integral with the frame 4 of the seat-back and having a second inwardly toothed circular sector 5 centred on an axis B linked to flange 3 and parallel to axis A, the teeth of the two sectors 2 and 5 being adapted to coact by simply making the two axes A and B coincide in a vertical or substantially vertical direction C, said second flange 3 being provided with a circular opening 6 centred on axis B, a cylindrical hub 7 jointingly housed in opening 6, a transverse shaft 8 integral with hub 7, a control handle 9 integral with shaft 8 and easily accessible for the person seated, a plate 10 also integral with shaft 8, a helical tension spring 11 stretched between a point 12 on plate 10 and a point 13 on flange 1 so as to urge angularly said plate, and so handle 9, in the direction of arrow F, and a disc 14 also integral with the above elements 7 to 10 adjacent hub 7 and protruding radially in relation to this latter so as to slide against flange 3 while ensuring a good axial positioning of the hub in its cylindrical opening 6.

Said hinge comprises furthermore:

a through aperture 15 in flange 1 axially disposed against hub 7, and a cam 16 interlocked with the hub and housed in said aperture 15.

This cam is preferably formed by a cut out plate having the same thickness as flange 1.

The circumference of the cam and the edge of the aperture are defined by very particular profiled surfaces, adapted to cooperate with one another by relative abutments and/or sliding movements while automatically ensuring a jamming effect at the end of the locking, which effect causes particularly a total elimination of free motion.

Each of these profiled surfaces is smooth and cylindrical, the generatrix of each cylinder being transverse and horizontal, i.e. parallel to axes A and B and its directrix having the non circular shape defined hereafter.

The directrix of cam 16—i.e. the outer contour of this cam such as projected on to a vertical plane perpendicular to axis B—comprises:

a first section $b_1$ extending along an arc of a spiral or the like in relation to axis B and having, for the angular locking position of the cam, its end having the minimum radius in the upper quadrant (i.e. in the dihedron having for its edge axis B and defined by the two planes passing through this axis and inclined respectively by 45° from the horizontal in two opposite directions), a second rectilinear section $b_2$ extending radially in relation to axis B and continuing, towards this axis B, the end of section $b_1$ having maximum radius in a direction which is substantially horizontal for the angular positions of the cam corresponding to unlocking, and a third rectilinear section $b_3$ also extending substantially radially in relation to axis B and continuing, towards this axis, the other end of section $b_1$, i.e. the one having the minimum radius.

These three sections define a sort of tooth projecting from the cam, the rest of whose contour has generally the shape of an arc of a circle $b_4$.

Said tooth extends circumferentially at an angle generally between 45° and 90°, preferably of the order of 60°.

The directrix of aperture 15 provided in flange 1—i.e. the inner contour of the edge of this aperture such as projected on to a vertical plane perpendicular to axis A—comprises:

a first section $a_1$ extending along an arc of a spiral or similar in relation to axis A and situated essentially in the upper quadrant, a second section $a_2$ extending radially in relation to axis A in a substantially horizontal direction, a third rectilinear section $a_3$ continuing outwardly the end of section $a_1$ having the maximum radius, the two respective connecting zones of section $b_1$ with section $b_3$ and of section $a_1$ with section $a_3$ being located so as to be radially facing one another at the moment, during each unlocking operation, at which section $b_2$ of the cam abuts against section $a_2$ of the edge of the aperture, a fourth section $a_4$ extending along an arc of a spiral or similar and connecting the outer ends of both sections $a_2$ and $a_3$ so as to define the bottom of a notch, itself defined laterally by these two sections, the shape of said arc of a spiral being preferably provided so as to envelop substantially jointingly section $b_1$ of the cam at the end of the unlocking operations, and a fifth section $a_5$ extending along an arc of a circle or similar over approximately 180° and connecting mutually the end of section $a_1$ not connected to section $a_3$ and the end of section $a_2$ not connected to section $a_4$.

This latter section $a_5$ is provided sufficiently deep so that in the maximum locking position, at least when the hinge is new, there still remains a small vertical clearance i between the bottom of this section and the section $b_4$ opposite of the cam; thus there is reserved a margin for automatically compensating for the wear of the teeth during use, the position of the cam corresponding to complete locking being lowered progressively during said wear by progressively making good this vertical play i whilst larger and larger portions of section $b_1$ and $a_1$ of the cam and of the aperture come into mutual contact to ensure the desired jamming.

This type of automatic compensation of wear forms an important advantage of the invention.

Of course, so that the "longitudinal" horizontal guiding of the seat-back is correctly provided in the locking position in relation to the sitting portion, the width of section $a_5$ is provided so as to receive the cam without play in this direction, for said locking position.

The mutual connection zones of the different sections, not only of the cam but also of the aperture, are rounded off.

There can also be seen in the Figs.:

a groove 17 extending along an arc of a circle centred on axis A, pressed into flange 1 and adapted to receive, with some radial play j, a boss 18 stamped in flange 3, the angular abutments of this boss against the ends of this groove determining the end of travel of the angular deflections of flange 3 and so of the seat-back during unlocking, a hollow 19 stamped into flange 3 so as to make teeth 5 appear on a portion of this flange slightly staggered axially in relation to the rest of the flange, which allows the teeth to be disposed radially facing teeth 2 of flange 1, which is jointingly applied against flange 3, the zone of flange 3 disposed just below teeth 5 being provided with an elongated slot 20 following an arc of a circle centred on axis B, a flap 21 inserted against flange 3 so as to overlap teeth 2 and thus maintain the two flanges 1 and 3 against one another during their relative movements, and a transverse bar 22 resistant to torsion fixed on shaft 8 so as to transmit from one side to the other of the seat the angular operations of handle 9.

In FIGS. 1 and 3 it can also be seen that the angular extent of the fixed toothing 2 is here relatively small, e.g. of the order of 30°, whereas the angular extent of the mobile toothing 5 is here of the order of 60°.

The operation of the above hinge is the following.

At rest, the assembly of rotary parts 7 to 10 and 16 is urged angularly in the direction of arrow F by the tension of spring 11.

Section $b_1$ of cam 16 then occupies a position corresponding to the end of a sliding motion with jamming effect against section $a_1$ of the edge of the aperture. This jamming effect causes a heavy vertical pressure of section $a_1$ of the aperture against section $b_1$ of the cam.

Said cam is then pushed vigorously downwards, toothing 5 is itself firmly applied downwards against toothing 2 and the respective axes A and B of the cam and of the aperture are practically merged (FIGS. 1 and 2).

This urging towards mutual engagement of the teeth is promoted by the weight of the seat-back.

Said jamming effect results moreover in, on the one hand, preventing any unintentional return of handle 8 in the unlocking direction and, on the other hand, eliminating all free motion of the mechanism.

For unlocking the hinge, it is sufficient to turn the handle 9 in the direction of arrow G opposite arrow F.

This operation results in the succession of the two following movements:

initially the cam rotates about the fixed axis A, which makes section $b_1$ thereof slide horizontally against section $a_1$ of the aperture while "de-jamming" the mechanism, and this until section $b_2$ of the cam abuts against section $a_2$ of the aperture, from this abutment, the cam rocks about the fixed support zone P (FIG. 3) in which said abutment takes place, which lifts axis B of this cam in relation to axis A, said lifting being made possible by the presence of the two setoffs of the cam and of the aperture at their sections $b_3$ and $a_3$, which setoffs are then opposite one another: the rotation of the cam about zone P then makes the "tooth" of this cam penetrate into the "notch" of the aperture.

This rotation of the cam is accompanied by a lifting of the seat-back and its toothing 5, which separates from fixed toothing 2: the hinge is then unlocked.

The angular position of the seat-back about axis B can then be adjusted, this adjustment being preferably facilitated, in a way known per se, by the drawback of an appropriate spring, not shown, which angularly urges the seat-back forwards against the resistance of the user's back.

After obtaining the desired angular position of adjustment for the seat-back, the user has only to release handle 9 to obtain again locking of the hinge and of the seat-back in the chosen position, under the drawback effect of spring 11 combined with that of the weight of the seat-back.

This locking involves successively the following two phases, the reverse of the preceding ones:

in the first place, making axis B coincide with axis A by lowering the first towards the second during the return rotation of the cam about support zone P, then sliding of the spiral section $b_1$ of the cam against the spiral section $a_1$ of the edge of the aperture, which produces the wedging or jamming effect mentioned above, ensuring the complete mutual engagement of the two sets of teeth and the locking of the mechanism.

Following which and whatever embodiment is adopted, there is finally provided a seat hinge whose constitution and operation follow sufficiently from what has gone before.

This hinge has numerous advantages in relation to those existing up to now, particularly in so far as the elimination of free motion is concerned and so of the noise and wear caused by such free motion, the reliability of locking which it provides, the robustness and the low cost price due to the small number of component parts.

It is to be noted that cam-aperture assemblies of the kind described above have already been proposed for the locking of mechanisms, but never before the present invention within the scope of a seat-back hinge of the kind concerned by this invention, i.e. whose unlocking involves a slight lifting of the seat-back: the cams of the seat-back hinge mechanisms previously known served solely to control the rotation of bolts pivotably mounted about fixed axes distinct from the hinge axes of the seat-backs, themselves fixed, said cams being pivotably mounted about third axes also fixed.

As is evident, and as it follows moreover already from what has gone before, the invention is in no way limited to those of its modes of application and embodiments which have been more especially considered; it embraces, on the contrary, all variations thereof.

We claim:

1. A seat-hinge for connecting the back to the sitting portion of a seat and comprising a first member to be fixed relative to the sitting portion and carrying a first toothed sector centered on an axis A, said axis A extending, in operation, horizontally and transversely of the sitting portion, a second member to be fixed relative to the back and carrying a second toothed sector centered on an axis B parallel to axis A, the sectors being engageable and disengageable with one another in response to movement of the two axes A and B towards and away from coincidence and the second member being provided with an opening which is centered on axis B and houses a hub; a rotary cam fixed to said hub, a control handle accessible, in use, to a person sitting on the seat and linked to the cam so that the operation of this handle causes rotation of the cam about axis B, a surface defined by the first member for coacting with an active area of the rotary cam, and a spring means for angularly urging the cam and the handle in the direction which corresponds to the mutual engagement of the two toothed sectors, the active area of the rotary cam being formed by an outward projection from the remainder of the rim of the cam and the radially outermost surface of the projection having the form of an arc of a spiral about axis B and having ends of greater and smaller radius which are joined to the said remainder of the rim by a narrower neck portion such that at least the said end of the greater radius overhangs the adjacent portion of the said remainder of the rim of the cam, the surface defined the first member for coacting with the active surface of the cam forming part of the edge of an aperture in the first member and having a first section in the form of an arc of a spiral about axis A upon which, in operation, the spiral arc surface of the cam projection slides and against which said surface of said cam projection then jams, responsive to rotation of the cam in a first direction, so as to lock the hinge, and an adjacent cut-out section providing a bearing zone against which the said end of greatest radius of the spiral arc surface of the cam projection bears, responsive to reverse rotation of the cam, to unlock the hinge such that, in operation, the cam rocks about this bearing zone to cause axes A and B to move apart and disengage the toothed sectors.

2. A seat hinge according to claim 1, characterized in that the profiles of the cam and of the aperture are such that, for the locking position, a slight radial play exists in the vertical direction between the area of the cam opposite the outermost section thereof and the facing portion of the edge of the aperture but that no play exists between the cam and the aperture in the horizontal direction perpendicular both to axis A and to vertical direction.

3. A seat hinge according to claim 1, characterised in that said outermost surface of the cam extends along an arc between 45° and 90°.

4. A seat hinge according to claim 2 wherein said arc is approximately 60°.